United States Patent [19]

Okubo et al.

[11] Patent Number: 5,075,162
[45] Date of Patent: Dec. 24, 1991

[54] MOLDED LAMINATED ARTICLE OF CROSS-LINKED POLYOLIFINE FOAM

[75] Inventors: Shunji Okubo, Otsu; Toshiharu Nakae, Gamou; Fusayoshi Akimaaru, Otsu; Kanji Tanaka, Kurita, all of Japan

[73] Assignee: Toray Industries, Inc., Tokyo, Japan

[21] Appl. No.: 630,442

[22] Filed: Dec. 20, 1990

Related U.S. Application Data

[62] Division of Ser. No. 317,519, Mar. 1, 1989, abandoned.

[30] Foreign Application Priority Data

| Mar. 1, 1988 [JP] | Japan | 63-49341 |
| Mar. 1, 1988 [JP] | Japan | 63-49342 |
| Oct. 7, 1988 [JP] | Japan | 63-254534 |

[51] Int. Cl.$^5$ ............................. B32B 3/26
[52] U.S. Cl. ............... 428/304.4; 428/308.4; 428/314.4; 428/317.1; 428/318.6; 428/319.7
[58] Field of Search ............ 428/304.4, 306.6, 308.4, 428/314.8, 317.1, 318.6, 319.7, 319.9

[56] References Cited

U.S. PATENT DOCUMENTS

| 3,608,006 | 9/1971 | Hosoda et al. | 428/319.9 |
| 4,769,278 | 9/1988 | Kamimura et al. | 156/245 |

FOREIGN PATENT DOCUMENTS

| 46839 | 3/1982 | European Pat. Off. | 428/159 |
| 60-063138 | 4/1985 | Japan | 264/259 |
| 61-127320 | 6/1986 | Japan | 264/259 |
| 62-053811 | 3/1987 | Japan | 264/259 |
| 63-126739 | 5/1988 | Japan | 428/314.8 |

*Primary Examiner*—William J. Van Balen
*Attorney, Agent, or Firm*—Birch, Stewart, Kolasch & Birch

[57] ABSTRACT

A molded laminated article is made from (a) a composite comprising a crosslinked polyolefin resin foam having an average gel proportion of 10 to 75% and an average expansion ratio of 5 to 40, in which the average expansion ratio in a portion having a thickness of 0.5 mm on the side of one surface of the foam is larger than the average expansion ratio in a portion having a thickness of 0.5 mm on the side of the other surface thereof and the difference between said average expansion ratios is from 2 to 20, and a skin material bonded to the surface having the larger average expansion ratio, and (b) a thermoplastic resin as a skeleton material, as follows. The composite is placed at a predetermined position intermediate between a pair of upper and lower mold halves so that the skin material side of the composite confronts or is in contact with the molding surface of one of the mold halves and the melt of the thermoplastic resin confronts or is in contact with the molding surface of the other of the mold halves; and the mold halves are clamped to effect compression molding. The molded laminated article is useful as an interior article for a vehicle.

11 Claims, 2 Drawing Sheets

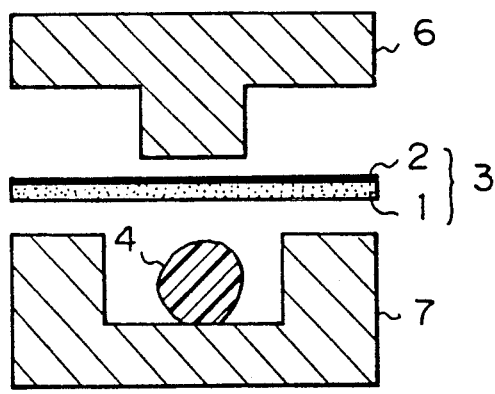
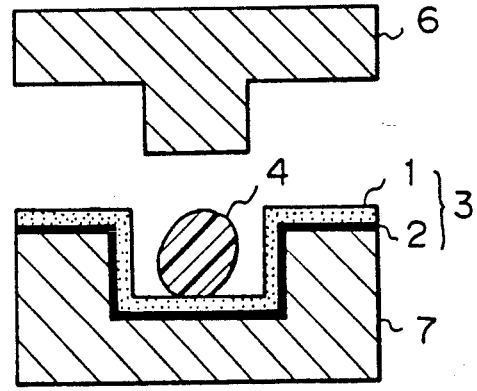
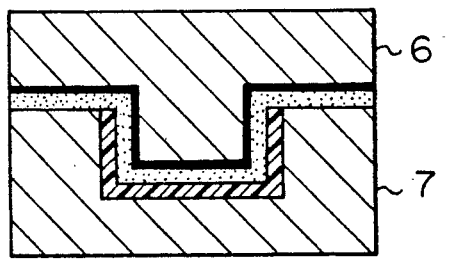
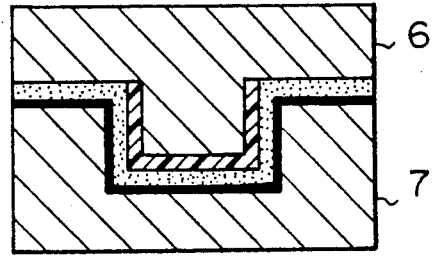
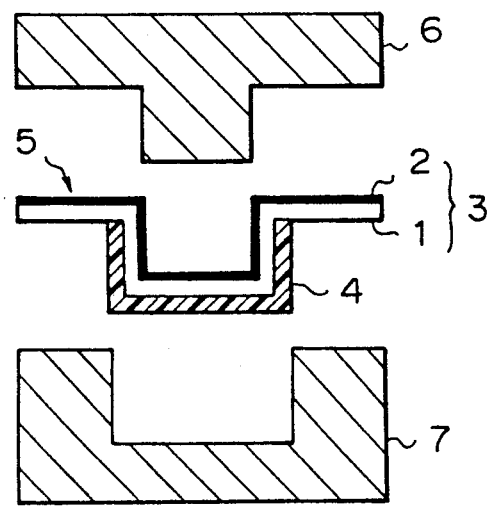
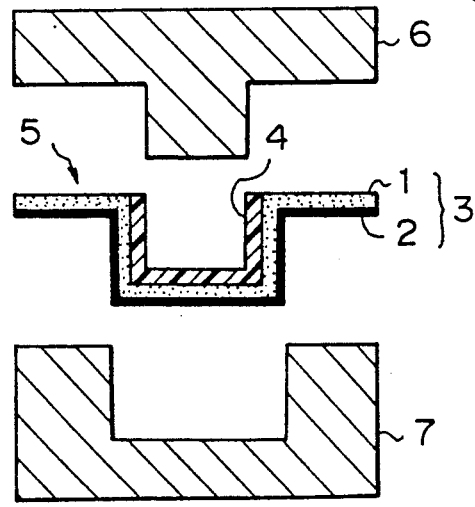

MOLDED LAMINATED ARTICLE OF CROSS-LINKED POLYOLIFINE FOAM

This application is a divisional, of application Ser. No. 07/317,519 filed on Mar. 1, 1989, now abandoned.

BACKGROUND OF THE INVENTION

(1) Field of the Invention

The present invention relates to a molded laminated article comprising a polyolefin resin foam having a skin material bonded to one surface and a thermoplastic resin skeleton integrally molded on the other surface. This molded laminated article is valuable as an interior article of a vehicle such as an automobile.

(2) Description of the Related Art

The following processes are known for preparing a molded interior article of this type for a vehicle.

(i) First Conventional Process

As disclosed in Japanese Unexamined Patent Publication No. 54-10367, a resin base layer (skeleton) pre-molded in a predetermined shape is set in a male half of a mold; an adhesive dispersed in an organic solvent is coated on the surface of the resin base layer by spraying or the like; a composite comprising a polyolefin resin foam and a skin material laminated on the polyolefin resin foam, which is heated at a high temperature, is placed on the adhesive-coated surface; air is removed from a space between a female half of the mold and the composite and a space between the composite and the resin base layer by vacuum suction to firmly adhere the composite to the resin base layer; and compressed air is supplied onto the skin material of the composite to compress the composite to the resin base layer, whereby a molded interior article of a desired shape for a vehicle is obtained.

(ii) Second Conventional Process

As disclosed in Japanese Unexamined Patent Publication No. 54-158471, a skin material such as plasticized polyvinyl chloride is laminated on one surface of a polyolefin resin foam sheet by using an adhesive or by extrusion lamination, a resin base layer (skeleton material) is bonded to the other surface to obtain a laminate, and the laminate is compression-molded in the heated and softened state by using a mold to obtain a molded interior article of a desired shape for a vehicle.

(iii) Third Conventional Process

As disclosed in Japanese Unexamined Patent Publication No. 62-181113 and 62-181114, a laminate sheet comprising a resin foam cushion sheet, a skin material bonded to one surface of the cushion sheet and a protective film bonded to the other surface thereof is placed in a position intermediate between a pair of upper and lower mold halves so that the skin material side of the laminate sheet confronts or is in contact with the molding surface of one of the mold halves; a melt of a thermoplastic resin as a skeleton material is supplied to a position between the protective film side of the laminate sheet and the molding surface of the other mold half; and the mold halves are clamped.

The above-mentioned conventional processes have the following problems.

In the first conventional process, since the steps of pre-molding the resin base layer in a desired shape and coating the adhesive on the resin base layer are necessary, the number of the steps is large and the productivity is low. Furthermore, since an organic solvent is necessary for dispersing the adhesive, and thus the working environment is adversely affected and there is a risk of a fire due to the easy ignitability of the solvent. Moreover, the manufacturing cost is high.

In the second conventional process, to soften the resin base layer, it is necessary to heat the resin base material, and since a pressure is applied to the foam sheet in the heated state, the temperature of the foam sheet on the side bonded to the resin base layer is elevated and cells are expanded, deformed and destroyed, and the resin base layer is not diffused to flow. Moreover, this destruction spreads to cells on the skin material side and the reaction force is transmitted to the skin material side, with the result that the surface of the resin base layer becomes uneven, whereby the commercial value is reduced and defective products are often formed to reduce the product yield.

In the third conventional process, when the melt of the thermoplastic resin as a skeleton material is placed in contact with the resin foam cushion sheet, the surface portion of the foam is partially melted and furthermore, when the mold halves are clamped, the cells of the resin foam are partially destroyed. Thus, the surface of the skin material side of the resulting product becomes uneven or has undesirable charge marks.

SUMMARY OF THE INVENTION

The present invention was completed in view of the above problems, and thus an object of the present invention is to provide a process for the preparation of a molded laminated article valuable as an interior material for a vehicle, in which an adhesive is not used at the integral molding step or preliminary molding of the composite or skeleton and the productivity is enhanced.

More specifically, in accordance with the present invention, there is provided a process for the preparation of a molded laminated article, which comprises: placing (a) a composite comprising a crosslinked polyolefin resin foam having an average gel proportion of 10 to 75% and an average expansion ratio of 5 to 40, in which the average expansion ratio in a portion having a thickness of 0.5 mm on the side of one surface of the foam is larger than the average expansion ratio in a portion having a thickness of 0.5 mm on the side of the other surface thereof and the difference between said average expansion ratios is from 2 to 20, and a skin material bonded to the surface having the larger average expansion ratio, and (b) a melt of a thermoplastic resin as a skeleton material, in a predetermined position intermediate between a pair of upper and lower mold halves so that the skin material side of the composite confronts or is in contact with the molding surface of one of the mold halves and the melt of the thermoplastic resin confronts or is in contact with the molding surface of the other of the mold halves; and clamping the mold halves to effect compression molding.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIGS. 2(a)-(c) is a view illustrating an embodiment of the process of the present invention; and FIGS. 3(a)-(c) is a view illustrating another embodiment of the process of the present invention.

DESCRIPTION OF THE PREFERRED EMBODIMENTS

Figure 1:
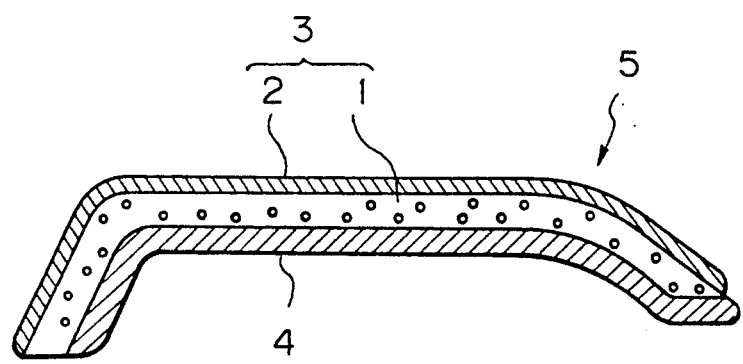
FIG. 1 is a cross-sectional view showing an example of the molded laminated article prepared according to the process of the present invention, which is used as an interior material for a vehicle.

As the material of the polyolefin resin foam used in the present invention, for example, preferably a propylene/ethylene random, block or random-block copolymer having an ethylene content of 0.5 to 35% is used. Furthermore, there can be mentioned a polyethylene resin having a density of 0.897 to 0.955 g/ml and a melt index of 1 to 50 g/10 min, a propylene/butene random, block or random-block copolymer, a linear ethylene/α-olefin copolymer, a copolymer of ethylene with vinyl acetate, acrylic acid or an acrylic acid ester, and a blend of two or more of these polyolefins.

Other resins may be incorporated in the above-mentioned resin, so long as they do not have an adverse effect on the foam.

The average gel proportion of the crosslinked polyolefin resin foam used in the present invention is 10 to 75%, preferably 35 to 75%, more preferably 40 to 60%. If the average gel proportion is lower than 10%, cells are destroyed by heat and pressure applied at the molding step, and the surface on the skin material side becomes uneven. On the other hand, if the average gel proportion exceeds 75%, molding becomes extremely difficult.

The average gel proportion of the crosslinked polyolefin resin foam is a value determined by the following method. The foam is cut into a cube having a side of about 1 mm, and about 0.1 g of the cut foam is precisely weighed. The weight is designated as A (g). The sample is heated at a temperature of 130° C. in tetralin for 3 hours and then cooled, the sample is washed with acetone and then with water, to remove the eluted substance, and the sample is then dried. The dried sample is precisely weighed, and the weight is designated as B (g). The gel proportion (%) is calculated by the following formula:

$$\text{Average gel proportion (\%)} = (B/A) \times 100$$

The average expansion ratio of the crosslinked polyolefin resin foam is 5 to 40, preferably 10 to 20. If the expansion ratio exceeds 40, the strength of the molded article is reduced and molding of an article having a complicated shape becomes difficult. If the expansion ratio is lower than 5, the cushioning property of the foam is reduced, and the characteristics derived, for example, for an interior molded article for a vehicle, cannot be obtained.

The difference between the average expansion ratio of a portion having a thickness of 0.5 mm on the side of one surface of the foam and a portion having a thickness of 0.5 mm on the side of the other surface thereof is from 2 to 20. If this difference is smaller than 2, the surface of the skin material of the composite becomes uneven. If the difference is larger than 20, deformation such as warping occurs due to the difference of shrinkage by cooling after the molding.

The expansion ratio referred to in the instant specification and appended claims means the reciprocal number (1/A) of the apparent density (A g/cm³).

Preferably, at least one surface of the crosslinked polyolefin resin foam is a cell-exposed surface, and the thermoplastic resin as the skeleton material is integrally laminated on the cell-exposed surface. The cell-exposed surface is formed by slicing the once formed crosslinked polyolefin resin foam. Namely, the sliced exposed surface is the cell-exposed surface.

Preferably, the average cell diameter of a surface layer portion having a thickness of 1 mm from the surface at least on the side, on which the skeleton material is laminated, of the crosslinked polyolefin resin foam is not larger than 200 μm, especially not larger than 150 μm. If this average cell diameter exceeds 200 μm, cells are readily destroyed and the skin material surface becomes uneven.

The average cell diameter is determined by the following method. The surface layer portion of the foam is viewed at 20 to 30 magnifications by an electron microscope and the longitudinal section of the foam having the large cell diameter is photographed. The number N of cells present in a predetermined length L is counted, and the average cell diameter is calculated by the following formula:

Average cell diameter = predetermined length L/cell number N

Either a polyolefin resin foam prepared by using a foaming agent of the thermal decomposition type or a polyolefin foam prepared by the extrusion foaming method in which a polyolefin resin is kneaded with a liquid in an extruder and the liquid is gasified, can be used as the polyolefin resin foam in the present invention. Any known process for forming a crosslinked polyolefin resin foam can be adopted. A crosslinked polyolefin resin foam having an average expansion ratio of 5 to 40 is used.

As the preferred process, there can be mentioned a process in which a mixture comprising a polyolefin resin, a foaming agent and a crosslinking promoter is crosslinked by ionizing radiation and the mixture is heated at a temperature higher than the decomposition temperature of the foaming agent to effect foaming, and a process in which a mixture of a polyolefin, a foaming agent, an organic peroxide and a crosslinking promoter, optionally together with a crosslinking adjusting agent, is heated at a temperature higher than the decomposition temperatures of the organic peroxide and foaming agent to effect crosslinking and foaming. These processes are suitable for the production of an endless continuous foamed sheet.

Any compound which is solid at normal temperature and decomposed when heated at a temperature higher than the melting point of the polyolefin resin can be used as the foaming agent, so long as sheet forming or crosslinking reaction is not substantially hindered, but preferably a foaming agent having a decomposition temperature of 180° to 240° C. is used. As specific examples, there can be mentioned azodicarbonamide, a metal salt of azodicarboxylic acid and dinitrosopentamethylene-tetraamine. The foaming agent is used in an amount of 0.1 to 40% by weight based on the polyolefin resin, and the amount of the foaming agent incorporated can be optionally changed according to the kind of the foaming agent and the intended expansion ratio.

Where an organic peroxide is used as the crosslinking agent, preferably the decomposition point of the organic peroxide is higher than the flowing-initiating temperature of the polyolefin resin used in the present invention and the decomposition temperature of the organic peroxide is higher than about 120° C. especially higher than 150° C., if the decomposition half-value period is 1 minute. As specific examples, there can be mentioned methyl ethyl ketone peroxide (182° C.), t-butylperoxyisopropyl carbonate (153° C.) and dicumyl peroxide (171° C.). The organic peroxide is used in an amount of 0.01 to 10% by weight, preferably 0.05 to 5% by weight.

As typical instances of the crosslinking promoter, there can be mentioned divinylbenzene, diallylbenzene and divinylnaphthalene. Preferable the crosslinking promoter is incorporated in an amount of 0.1 to 30% by weight, especially 0.3 to 20% by weight, based on the polyolefin resin.

Mixing of the polyolefin resin with the foaming agent, crosslinking promoter and/or organic peroxide is accomplished by known mixing methods. For example, there can be mentioned a method using a Henschel mixer, a method using a Banbury mixer, a method using a mixing roll, a mixing method using a kneading extruder and a method in which a polyolefin resin is dipped in a solution containing the foaming agent, crosslinking promoter and/or organic peroxide. These methods can be used alone or in combination. Especially, where the resin is a powdery resin, a powder-mixing method using a Henschel mixer is advantageous. The powder mixing is generally carried out at a temperature of from room temperature to the softening temperature of the resin, and the melt mixing is generally carried out at a temperature of from the melting temperature of the resin to 185° C.

When a continuous foamed sheet is prepared, preferably a sheet is formed at a temperature lower than the decomposition temperature of the foaming agent by extrusion molding prior to foaming.

Crosslinking and foaming of the homogeneously mixed or knead-molded foaming composition can be accomplished by heating at 130° to 300° C., preferably 150° to 260° C., under an atmospheric or elevated pressure when an organic peroxide is used. Where crosslinking and decomposition of the foaming agent are caused substantially simultaneously, a method is adopted in which the foaming composition is heated for a time necessary for crosslinking and decomposition in a sealable mold where compression is possible, and foaming is effected simultaneously with a release of the pressure. This is especially effective when a powdery mixture is directly foamed. Where the foaming agent is not decomposed under high temperature crosslinking conditions, a method is adopted in which after the crosslinking, heating is carried out at a temperature higher than the decomposition temperature of the foaming agent under an atmospheric or elevated pressure to effect foaming. To obtain a foam having fine cells, preferably a method in which foaming is carried out under elevated pressure is adopted. The heating time necessary for the crosslinking or foaming varies depending upon the temperature for heating the composition and the thickness of the material to be foamed, but is generally 1 to 30 minutes.

Where the foaming composition is crosslinked by irradiation with ionizing radiation, electron beams from an electron beam accelerator and $\alpha$, $\beta$ and $\gamma$ rays from radioactive isotopes such as $^{60}Co$ are preferred as the ionizing radiation, although X-rays or ultraviolet rays can be used. The irradiation dose of the radiations is changed according to the kind of the crosslinking promoter and the intended crosslinking degree, but the irradiation dose is generally 0.1 to 30 Mrad, preferably 0.5 to 20 Mrad.

Foaming of the radiation-crosslinked resin is accomplished by heating at a temperature higher than the melting temperature of the polyolefin resin, preferably at a temperature higher than 190° C., under a normal, elevated or reduced pressure. A heating source or a heating medium can be optionally selected according to the shape of the unfoamed molded article or the pressure condition at the time of foaming, as in the above-mentioned cases.

As the means for making the average expansion ratios in both of the surface portions of the crosslinked polyolefin resin foam different from each other, a method is adopted in which, when the foamable sheet is foamed at a temperature higher than the decomposition temperature of the foaming agent by a foaming machine, the heating temperature for one surface is made higher than the heating temperature for the other surface to adjust the decomposition of the foaming agent and the melt stress of the polyolefin resin, or a method is adopted in which the crosslinking reaction degree is made different between the two surfaces. Furthermore, this difference can be realized by laminating polyolefin foams having a different average expansion ratio by using an adhesive or preferably, by fusion bonding.

As the means for exposing cells on one of the two surfaces of the crosslinked polyolefin resin foam, a method can be adopted in which the skin surface of a sliced crosslinked polyolefin foam is bonded to a crosslinked polyolefin resin, and a method can be adopted in which a sliced crosslinked polyolefin resin foam alone is used. The former method is preferred because an optional softness is freely selected and the adaptability to various uses is good.

As pointed out hereinbefore, preferably the average cell diameter in the surface portion of the crosslinked polyolefin resin foam at least on the side on which the skeleton material resin is laminated is not larger than 200 μm. As the means for obtaining a foam having such an average cell diameter, the following methods can be mentioned.

(1) The higher the crosslinking reaction degree (expressed by the gel proportion) in the resin composition, the smaller the cell diameter of the foam. For example, where crosslinking is effected by ionizing radiations such as $\alpha$ rays, $\beta$ rays, $\gamma$ rays, X-rays and ultraviolet rays, if the irradiation energy distribution is changed in the thickness direction and the irradiation energy in the surface layer portion is increased, the gel proportion can be increased in this portion, whereby the cell diameter in this portion can be reduced.

(2) Where the crosslinked foamable sheet is heated to effect foaming, if the foamable sheet is rapidly heated, many structures acting as the cell nucleus can be formed in a short time in the surface layer portion of the foam, and therefore, the cell diameter can be reduced in the surface portion.

These methods (1) and (2) can be used alone or in combination.

The crosslinked polyolefin resin foam is generally used in the form of a sheet or plate, and the thickness is in the range of from 0.5 to 20 mm.

As the skin material to be bonded to the crosslinked polyolefin resin foam in the present invention, there can be used known skin materials such as a fabric composed of natural or man-made fibers, a sheet composed of a polyvinyl chloride resin, a thermoplastic elastomer sheet, a leather and a sheet composed of a mixture of a polyvinyl chloride resin and an ABS resin. The thickness of the skin material is generally in the range of from 0.02 to 1.5 mm.

A polypropylene resin is preferably used as the thermoplastic resin as the skeleton material in the present invention, but the above-mentioned material of the polyolefin resin foam, an ABS resin and a polystyrene resin and the like can be used.

As the preferred combination of the polyolefin resin foam and the thermoplastic resin as the skeleton material, there can be mentioned a combination of a propylene polymer resin foam and a polypropylene resin, but a combination of an ethylene polymer resin foam and a polyethylene resin and a combination of heterogeneous resins such as a propylene polymer resin foam and an ethylene polymer resin can be used. Where heterogeneous resins are combined, however, these resins are fusion-bonded through an adhesive film such as an Adomer film (supplied by Mitsui Petrochemical) or Kuranbetter (supplied by Kurabo Industries).

As a typical instance of the thermoplastic resin as the skeleton material, there can be mentioned a polyolefin having an endothermic peak at (TmF−60° C.) to (TmF+60° C.), especially (TmF−35° C.) to (TmF+35° C.), in which TmF represents the endothermic peak temperature of the crosslinked polyolefin resin foam as determined by a differential scanning calorimeter (DSC), and a melt index of at least 1.0 g/10 min as measured at 190° C.

The endothermic peak temperature determined by DSC (differential scanning calorimeter), referred to herein, means the temperature at which a highest endothermic peak appears among endothermic peaks observed when 0.1 mg of a sample is measured at a temperature-elevating rate of 50° C./min and a temperature-dropping rate of 50° C./min.

If the above-mentioned endothermic peak temperature of the polyolefin resin for the skeleton material is lower than (TmF−60° C.) in which TmF stands for the endothermic peak temperature of the crosslinked polyolefin resin foam, the heat resistance temperature of the obtained molded laminated article is low. If the endothermic peak temperature exceeds (TmF+60° C.), cells of the crosslinked polyolefin resin foam are easily destroyed by the melting heat of the polyolefin resin for the skeleton material at the molding step.

If the melt index of the polyolefin resin as the skeleton material is smaller than 1.0 g/10 min at 190° C., the number of cells broken of the crosslinked polyolefin resin foam at the molding step is increased.

The melt index referred to herein is a value (g/10 min) obtained by applying a load of 2.16 kg to 4 to 5 g of a sample under heating at 190° C. and multiplying the weight of the sample discharged from a nozzle by 10 (see ASTM D-1238).

Another typical example of the skeleton resin is a blend of 100 parts by weight of a polyolefin resin having a melt index of 1 to 60 g/10 min at 190° C. with 2 to 40 parts by weight of a low-molecular-weight polyolefin resin having an average molecular weight of 2,000 to 20,000. If the melt index of the polyolefin resin as the main component is smaller than 1 g/10 min at 190° C. the flowability is degraded and when a pressure is applied at the molding step, cells of the crosslinked polyolefin resin foam are often destroyed or setting in fatigue is readily caused. If the melt index exceeds 60 g/10 min at 190° C., the flowability becomes too high and the impact resistance of the skeleton resin is degraded. As the low-molecular-weight polyolefin resin, there can be mentioned polypropylene, polyethylene and a propylene/ethylene copolymer, each having an average molecular weight of 2,000 to 20,000. These polymers can be used alone or as a mixture of two or more thereof. If the average molecular weight is lower than 2,000, the strength of the resin is reduced and the elongation is lowered, and the moldability is degraded. If the average molecular weight exceeds 20,000, the flowability is degraded, and when a pressure is applied at the molding step, destruction of cells of the crosslinked polyolefin resin foam or setting in fatigue often occurs, and convexities and concavities are easily formed on the outer surface of the skin material.

Whether the above-mentioned low-molecular-weight polyolefins are used alone or as a mixture of two or more thereof, the mixing ratio by weight of the low-molecular-weight polyolefin to the polyolefin resin having a melt index of 1 to 60 g/10 min at 190° C. for the skeleton material is 2/100 to 40/100. If the mixing ratio is smaller than 2/100, the flowability is degraded and when a pressure is applied at the molding step, destruction of cells of the crosslinked polyolefin resin foam or setting in fatigue occurs and the outer surface of the skin material becomes uneven. If the mixing ratio exceeds 40/100, the strength of the final molded laminated article is reduced. Note, the molecular weight is measured by the vapor pressure permeation method or the gel permeation chromatography method (GPC).

An inorganic compound such as talc, silica or calcium carbonate can be incorporated in the resin as the skeleton material, so long as the characteristics of the resin as the skeleton material are not adversely affected. Moreover, a known additive such as a heat stabilizer, an antioxidant, a nucleating agent or a colorant can be added to the resin as the skeleton material, as required. A resin other than the olefin resin, for example, an ABS resin, a polystyrene resin or a petroleum resin, can be added to the skeleton resin, so long as the moldability is not degraded.

The process for preparing a molded laminated article from the laminate of the polyolefin resin foam and the skin material, and the resin as the skeleton material will now be described.

The molded laminated article is prepared by the hot stamping molding process. More specifically, the thermoplastic resin for the base layer (skeleton material), which is in the molten state, is supplied in the form of spots or a sheet on the molding surface of one of the mold halves and the composite of the polyolefin resin foam with the skin material bonded to the foam is supplied at an optional temperature onto the molten thermoplastic resin and the assembly is compressed in this state, whereby the base resin layer resin is integrally heat-fusion-bonded to the foam side (i.e., skin material-free side) of the composite.

FIG. 2(a)–(c) illustrates an embodiment of the hot stamping molding process. As shown in FIG. 2(a), a composite 3 comprising a polyolefin resin foam 1 and a skin material 2 bonded thereto is arranged at a predetermined position between a pair of upper and lower mold halves 6 and 7, and an appropriate amount of a molten thermoplastic resin 4 as the skeleton material is supplied to a predetermined position intermediate between the skin material-free surface of the composite 3 and the molding surface of the lower mold half 7. Then, as shown in FIG. 2(b), compression molding is carried out under predetermined temperature conditions by clamping the mold halves 6 and 7, whereby a molded laminated article 5 having the skeleton material 4 integrated with the foam 1 of the composite 3, as shown in FIG. 2(c), is obtained.

FIG. 3(a)–(c) illustrates another embodiment of the hot stamping molding process. A pre-formed composite 3 is arranged at a predetermined position on a lower mold half 7 so that a foam 1 of the composite 3 is located on the upper side, and a molten thermoplastic resin 4 as the skeleton material is supplied onto the foam 1. Then, compression molding is carried out by clamping the upper and lower mold halves 6 and 7, as shown in FIG. 3(b), and a molded laminated article 5 as shown in FIG. 3(c) is obtained.

The present invention will now be described in detail with reference to the following examples. Note, all of "%" and "parts" in the examples are by weight unless otherwise indicated.

EXAMPLE 1

A composition was prepared by homogeneously mixing 100 parts of a mixture comprising 80% of a propylene copolymer having 5% of ethylene copolymerized therewith and 20% of linear polyethylene having a melt index (MI) of 8.0 g/10 min at 190° C. and a density of 0.930 g/ml, with 10 parts of azodicarbonamide as the foaming agent, 2 parts of trimethylolpropane triacrylate as the crosslinking promotor and 0.3 part of a phenol/phosphorus type antioxidant. The composition was melt-extruded into a sheet having a thickness of 1.50 mm in an extruder by the T-die method, the sheet was irradiated with ionizing radiation so that the average gel proportion was 50%, and foaming was effected in a salt bath maintained at 235° C.

The obtained crosslinked polyolefin resin foam had an apparent density of 0.050 g/cm$^3$ (the average expansion ratio of the entire foam was 20), a thickness of 3.0 mm, an average gel proportion of 55% and an endothermic peak temperature TmF of 133° C., and the apparent density of a portion having a thickness of 0.5 mm from one surface (surface A) (the portion having a thickness 0.5 mm from the surface is hereinafter referred to as "surface layer portion") was 0.045 g/cm$^3$ (the average expansion ratio was 22) and the apparent density of the other surface layer portion was 0.0625 g/cm$^3$ (the average expansion ratio was 16). The average cell diameter in a portion having a depth of 1 mm from the surface on the small average expansion ratio side of the crosslinked polyolefin resin foam was 170 μm. The average cell diameter in a portion having a depth of 1 mm from the surface on the large average expansion ratio side of the resin foam was 340 μm. A plasticized polyvinyl chloride sheet having a thickness of 0.40 mm was bonded as the skin material to the large average expansion ratio side of the foam by using a two-liquid type polyester adhesive to obtain a composite.

Polypropylene having an MI of 42 g/10 min at 190° C. and an endothermic peak temperature Tm of 153° C. as the thermoplastic resin as the skeleton material was made molten at a temperature of 190° C., and 56 g of the melt was extruded on the molding surface of a mold half by the T-die method. The above-mentioned composite was placed on the extruded polypropylene resin so that the small average expansion ratio side of the crosslinked polyolefin resin foam was in contact with the extruded polypropylene resin, and the assembly was integrally molded under a pressure of 50, 100 or 200 kg/cm$^2$ by a 26-ton press, whereby an interior molded article 5 for a vehicle comprising the skeleton material 4 fusion-bonded to the composite 3 comprising the skin material 2 and the crosslinked polyolefin resin foam 4, as shown in FIG. 1, was obtained.

COMPARATIVE EXAMPLE 1

In contrast with Example 1, the skin material was bonded to the small average expansion ratio side of the crosslinked polyolefin resin foam, and in the same manner as described in Example 1, the polypropylene resin was fusion-bonded to the large average expansion ratio side and integral molding was carried out, whereby an interior molded article for a vehicle was obtained.

COMPARATIVE EXAMPLE 2

A commercially available polyolefin resin foam where the difference of the average expansion ratio between the two surface layer portions was less than 2 and was not significant (the average apparent density was 0.05 g/cm$^3$, the average gel proportion was 32%, the endothermic peak temperature TmF was 133° C. and the thickness was 3 mm) was used, and the same skin material as used in Example 1 was bonded to one surface of the resin foam. In the same manner as described in Example 1, the polypropylene resin was fusion-bonded and molding was carried out, whereby an interior molded article for a vehicle was obtained.

The surface state of the skin materials of the molded obtained in Example 1 and Comparative Examples 1 and 2 were observed. The obtained results are shown in Table 1.

TABLE 1

|  | Molding Pressure (kg/cm$^2$) | | |
|---|---|---|---|
|  | 50 | 100 | 200 |
| Example 1 | A | A | B |
| Comparative Example 1 | B | C | D |
| Comparative Example 2 | D | D | D |

Each symbol in Table 1 has the following meaning.
A: the surface of the skin material is even and smooth
B: the surface of the skin material was slightly uneven, but there was no problem of practical use
C: the molded article could not be practically used because of the uneven and rough surface of the skin material
D: the molded article had no practical utility because of conspicuous unevenness and roughness on the surface of the skin material In the subsequent examples, the surface state was evaluated in the same manner as described above.

EXAMPLE 2

A composition was prepared by homogeneously mixing 100 parts of a mixture comprising 80% of a propylene copolymer having 5% of ethylene copolymerized therewith and 20% of a linear polyester having MI of 8.0 g/10 min at 190° C. and a density of 0.930 g/cm$^3$, with 6 parts (corresponding to a expansion ratio of 15) or 12 parts (corresponding to a expansion ratio of 25) of azodicarbonamide as the foaming agent, 3 parts of ethylene glycol dimethacrylate as the crosslinking promotor and 0.3 part by weight of a phenol/phosphorus antioxidant. The composition was melt-extruded into a sheet having a thickness of 1.10 mm (the expansion ratio was 15) or 1.00 mm (the expansion ratio was 25) by the T-die method. The sheet was irradiated with ionizing radiation so that the average gel proportion was 35%, and foaming was effected in a salt bath maintained at 230° C. to obtain a foam having an apparent density of 0.067 g/ml (the expansion ratio was 15) or 0.040 g/ml (the expansion ratio was 25).

The obtained crosslinked polyolefin resin foam having an expansion ratio of 15, a thickness of 2.0 mm and a gel proportion of 35% was sliced into 1 mm portions to obtain a crosslinked polyolefin resin foam having a gel proportion of 45% in the sliced cell-exposed surface layer portion. The skin surface of the sliced polyolefin resin foam was press-bonded to the skin surface of the crosslinked polyolefin resin foam having an expansion ratio of 25, a thickness of 2.0 mm and a gel proportion of 35% by pressing roll while feeding hot air maintained at 400° C. to the surfaces to be fusion-bonded by a hot air generator to melt the surface portions, whereby a polyolefin resin foam having a cell-exposed surface on one side was obtained. As the means for melting the surface layer portions, various methods could be adopted, such as a method in which the sides to be fusion-bonded were heated by an electric heater. In the bonded foam, the expansion ratio of the surface layer portion on the sliced surface side was 14.3 and the expansion ratio of the surface layer portion on the skin surface side was 18.2. The average cell diameter in a portion of a thickness of 1 mm on the sliced surface side was 165 μm. The endothermic peak temperature TmF of each crosslinked polyolefin resin foam was 135° C.

A composite 3 was prepared by bonding a plasticized polyvinyl chloride sheet 2 having a thickness of 0.45 mm as the skin material to the skin surface on the side of an expansion ratio of 25 in the crosslinked polyolefin resin foam 1 by using a two-liquid type adhesive, as shown in FIG. 1.

A polypropylene resin (having an MI of 42 g/10 min at 190° C. and an endothermic peak temperature Tm of 153° C.) as the thermoplastic resin as the skeleton material was made molten at 203° C. and 56 g of the melt was extruded on the molding surface of a mold half by the T-die method. The composite was placed on the molten polypropylene resin so that the cell-exposed surface (sliced surface) of the crosslinked polyolefin resin foam was placed in contact with the molten polypropylene resin. The assembly was molded by applying a pressure of 50 or 100 kg/cm² for 30 seconds by a 26-ton press heated at 40° C. to obtain an interior molded article for a vehicle, comprising the skeleton material fusion-bonded to the composite.

EXAMPLE 3

A crosslinked polyolefin resin foam having an average expansion ratio of 25, a thickness of 2.0 mm and an average gel proportion of 35%, which was prepared in the same manner as described in Example 2, was sliced into 1 mm portions to obtain a crosslinked polyolefin resin foam in which the gel proportion was 45% in the surface layer portion on the cell-exposed side. The skin surface of the sliced foam was press-bonded to the skin surface of the crosslinked polyolefin resin foam having an expansion ratio of 25, a thickness of 2.0 mm and a gel proportion of 35% by a press roll while feeding hot air maintained at 400° C. to the surface to be fusion-bonded by a hot air generator to melt the surface layer portions, whereby a polyolefin resin foam having a cell-exposed surface on one side was obtained. In the obtained bonded foam, the expansion ratio of the surface layer portion on the sliced surface side was 21.3 and the expansion ratio of the surface layer portion on the skin surface side was 17.9. The average cell diameter in a portion having a thickness of 1 mm from the surface on the sliced surface side was 180 μm. The endothermic peak temperature TmF of the polyolefin resin foam was 135° C.

In the same manner as described in Example 2, a plasticized polyvinyl chloride sheet was bonded to the skin surface of the bonded crosslinked polyolefin resin foam to obtain a composite, and in the same manner as described in Example 2, a polypropylene resin as the thermoplastic resin as the skeleton material was integrated with the composite, whereby an interior molded article for a vehicle, comprising the skeleton material fusion-bonded to the composite, was obtained.

The surface state of the skin material in each of the molded articles obtained in Examples 2 and 3 was observed, and the results are shown in Table 2.

TABLE 2

|  | Molding Pressure (kg/cm²) | |
| --- | --- | --- |
|  | 50 | 100 |
| Example 2 | A | A |
| Example 3 | A | B |

EXAMPLES 4 THROUGH 12

A composition was prepared by homogeneously mixing 100 parts of a mixture comprising 80% of a propylene copolymer having 5% of ethylene copolymerized therewith and 20% of an ethylene copolymer having 8% of butene copolymerized therewith, with 5, 10 or 15 parts of azodicarbonamide as the foaming agent, 4 parts of divinylbenzene as the crosslinking promoter and 0.3 part of a phenol type antioxidant. The composition was melt-extruded into a sheet having a thickness of 2 mm by an extruder. The sheet was irradiated with ionizing radiation so that the average gel proportion was 30 to 33%, 47 to 53% or 65 to 72%, and foaming was effected in a salt bath maintained at 230° C. A composite was prepared by bonding a plasticized polyvinyl chloride sheet having a thickness of 0.4 mm by using a polyester type adhesive.

This composite was molded with a base resin layer as the skeleton material according to the following method. More specifically, a pair of an upper male mold half and a lower female mold half each having a diameter of 50 mm and a depth of 10, 20, 30, 40 or 50 mm were attached to a compression molding machine. The composite was set between the upper male mold half and the lower female mold half while maintaining the mold temperature at 50° C. A polypropylene resin for the base layer as the skeleton material, which had a melt index (MI) of 11 g/10 min at 190° C. and an endothermic peak temperature (Tm) of 143° C. and was in the molten state, was placed on the lower female mold half at a resin temperature of 170° C., and molding was carried out under a gauge pressure of 200 kg/cm².

With respect to the obtained molded article, the surface state of the molded article and the state of destruction of cells in the molded article were examined, and the results are shown in Table 3.

EXAMPLES 13 and 14

A composition was prepared by homogeneously mixing 100 parts of a mixture comprising 70 or 50% of a propylene copolymer (PP) having 11% of ethylene random/block-copolymerized therewith and 30 to 50% of an ethylene copolymer (PE) having 5% of hexene copolymerized therewith, with 7.5 parts of azodicarbonamide as the foaming agent, 6 parts of diallyl phthalate as the crosslinking promoter and 0.15 part of a phenol type antioxidant. The composition was melt-extruded into a sheet having a thickness of 2 mm by an extruder. The sheet was irradiated with ionizing radiation so that the average gel proportion was 65 to 73%, foaming was effected in an oil bath maintained at 235° C. A plasticized polyvinyl chloride sheet having a thickness of 0.4 mm was bonded to the obtained foam by using a polyester type adhesive, to obtain a composite.

The composite was molded with a base layer resin as the skeleton material according to the following method. A pair of an upper male mold half and a lower female mold half each having a diameter of 50 mm and a depth of 10, 20, 30, 40 or 50 mm were attached to a compression molding machine. The composite was set between the upper male mold half and the lower female mold half while maintaining the mold temperature at 50° C., and 56 g of a polypropylene resin for the base layer as the skeleton material, which had a melt index (MI) of 2.5 g/10 min at 190° C. and an endothermic peak temperature (Tm) of 158° C., was placed on the lower female mold half at a resin temperature of 186° C. Molding was carried out under a gauge pressure of 200 kg/cm$^2$.

With respect to the obtained molded article, the surface state of the molded article and the state of destruction of cells of the foam of the molded article were examined, and the results are shown in Table 3.

sity of 0.930 g/cm$^3$, in the same manner as described in Example 1. In a portion having a thickness of 1 mm from the surface on the small expansion ratio side of the foam, the average cell size was 170 μm. A square composite having a side of 20 cm was prepared by bonding a plasticized polyvinyl chloride sheet having a thickness of 0.4 mm to the large expansion ratio side of the foam.

A resin composition for the base layer as the skeleton material was prepared by homogeneously mixing 100 parts of a propylene copolymer having 10% of ethylene copolymerized therewith, which had a melt index of 18 g/10 min at 190° C., with 20 parts of talc, 5 parts of low-molecular-weight polypropylene having an average molecular weight of 6,000 and 0.1 part of a phenol type stabilizer (antioxidant). Then, about 25 g of the resin composition was melt-extruded from an extruder at an extruded resin temperature of 170° to 175° C., the extrudate was placed on a lower female mold half of a molding machine and the above-mentioned composite was placed between an upper male mold half and the lower female mold half while maintaining the mold temperature at 60° C. Compression molding was carried out under a pressure of 58 kg/cm$^2$ by a hydraulic press to obtain a molded laminated article.

EXAMPLE 16

A molded laminated article was prepared by carrying out compression molding under the same conditions as described in Example 15 except that the amount of the low-molecular-weight polypropylene mixed was changed to 10 parts.

EXAMPLE 17

TABLE 3

| Example No. | Amount of Foaming Agent (parts) | Average Gel Proportion (%) | Average Expansion Ratio | Expansion Ratio of Surface Layer Portion Skeleton material side | Expansion Ratio of Surface Layer Portion Skin material side | Average Cell Size of Surface Layer Portion (μm) | Endothermic Peak Temperature of Foam (Tm F) (°C.) | Endothermic Peak Temperature Tm (°C.) of Base Layer | MI of Base Layer (g/10 min; 190° C.) | Surface State of Molded Article | Draw Formability (H/D)*1 |
|---|---|---|---|---|---|---|---|---|---|---|---|
| 4 | 5 | 31 | 10.5 | 8.3 | 11.1 | 150 | 135.5 | 143 | 11 | B | 1.0 |
| 5 | 5 | 48 | 10.0 | 8.3 | 11.1 | 150 | 135.5 | 143 | 11 | A | 0.6 |
| 6 | 5 | 67 | 8.3 | 7.1 | 9.1 | 120 | 135.5 | 143 | 11 | A | 0.4 |
| 7 | 10 | 30 | 20.4 | 15.4 | 17.5 | 180 | 135.4 | 143 | 11 | B | 1.0 |
| 8 | 10 | 49 | 19.6 | 14.9 | 17.2 | 160 | 135.4 | 143 | 11 | A | 0.6 |
| 9 | 10 | 68 | 18.9 | 13.0 | 16.7 | 120 | 135.4 | 143 | 11 | A | 0.4 |
| 10 | 15 | 33 | 12.3 | 24.4 | 29.4 | 198 | 133.6 | 143 | 11 | B | 0.6 |
| 11 | 15 | 52 | 29.4 | 20.8 | 30.3 | 180 | 133.6 | 143 | 11 | A | 0.4 |
| 12 | 15 | 66 | 28.6 | 20.8 | 29.4 | 170 | 133.6 | 143 | 11 | A | 0.2 |
| 13 | 7.5 | 68 | 14.9 | 13.7 | 16.1 | 170 | 154.0 | 158 | 2.5 | A | 0.6 |
| 14 | 7.5 | 69 | 15.2 | 13.2 | 16.7 | 170 | 152.8 | 158 | 2.5 | B | 0.4 |

Note
*1 ratio of diameter H to depth D of molded article
*2 PP/PE ratio of 70/30 in Example 13 and PP/PE ratio of 50/50 in Example 14

EXAMPLE 15

A crosslinked polyolefin resin foam having an average expansion ratio of 14.9, an average gel proportion of 49.9% and an endothermic peak temperature TmF of 135° C., in which the apparent density of one surface portion was 0.073 g/cm$^3$ (the expansion ratio was 13.7) and the apparent density of the other surface layer portion was 0.063 g/cm$^3$ (the expansion ratio was 15.9), was obtained from a mixture comprising 80% of a propylene copolymer having 5% of ethylene copolymerized therewith and 20% of an ethylene copolymer having 5% of 4-methylpentene-1 copolymerized therewith, which had an MI of 1.0 g/10 min at 190° C. and a den- A molded laminated article was prepared by carrying out compression molding under the same conditions as described in Example 15 except that the amount of the low-molecular-weight polypropylene mixed was changed to 10 parts and a crosslinked polyolefin resin foam having an apparent density of 0.050 g/cm$^3$ (the average expansion ratio was 20) and an average gel proportion of 50.8% was used as the crosslinked polyolefin resin foam.

EXAMPLE 18

A molded laminated article was prepared by carrying out compression molding under the same conditions as described in Example 15 except that the amount of the low-molecular-weight polypropylene mixed was changed to 20 parts.

EXAMPLE 19

A molded laminated article was prepared by carrying out compression molding under the same conditions as described in Example 15 except that the amount of the low-molecular-weight polypropylene mixed was changed to 20 parts and a crosslinked polyolefin resin foam having an apparent density of 0.050 g/cm³ (the average expansion ratio was 20) and an average gel proportion of 50.8% was used as the crosslinked polyolefin resin foam.

EXAMPLE 20

A molded laminated article was prepared by carrying out compression molding under the same conditions as described in Example 15 except that the amount of the low-molecular-weight polypropylene mixed was changed to 30 parts.

EXAMPLE 21

A molded laminated article was prepared by carrying out compression molding under the same conditions as described in Example 15 except that the amount of the low-molecular-weight polypropylene mixed was changed to 30 parts and a crosslinked polyolefin resin foam having an apparent density of 0.050 g/cm³ (the average expansion ratio was 20) and an average gel proportion of 50.8% was used as the crosslinked polyolefin resin foam.

With respect to each of the laminated molded articles obtained in Examples 15 through 21, the surface state of the molded article and the state of destruction of cells of the foam were examined, and the results are shown in Table 4.

TABLE 4

| Example No. | Amount of Low-Molecular-Weight Polypropylene (parts) | | | | Average Expansion Ratio | Average Gel Proportion (%) |
| --- | --- | --- | --- | --- | --- | --- |
| | 5 | 10 | 20 | 30 | | |
| 15 | B | — | — | — | 14.9 | 49.9 |
| 16 | — | A | — | — | 14.9 | 49.9 |
| 17 | — | B | — | — | 20.0 | 50.8 |
| 18 | — | — | A | — | 14.9 | 49.9 |
| 19 | — | — | A | — | 20.0 | 50.8 |
| 20 | — | — | — | A | 14.9 | 49.9 |
| 21 | — | — | — | A | 20.0 | 50.8 |

EXAMPLE 22

A crosslinked polyolefin resin having an average expansion ratio of 22.2, an average gel proportion of 48.9%, an endothermic peak temperature TmF of 135° C. and a thickness of 3.0 mm, in which the apparent density of the surface layer portion on one side was 0.052 g/cm³ (the expansion ratio was 19.2) and the apparent density of the surface layer portion on the other side was 0.041 g/cm³ (the expansion ratio was 24.4), was obtained in the same manner as described in Example 15 except that the concentration of the foaming agent was changed. The average cell diameter of a portion having a thickness of 1 mm from the surface on the small expansion ratio side was 170 μm. A plasticized polyvinyl chloride sheet having a thickness of 0.4 mm was bonded to the large expansion ratio side of the crosslinked polyolefin resin foam by using a polyester type adhesive to obtain a square composite having a side of 20 cm.

A resin composition for the base layer as the skeleton material was prepared by homogeneously mixing 100 parts of a propylene copolymer having 10% of ethylene copolymerized therewith and having a melt index of 4 g/10 min at 190° C. with 20 parts of talc, 10 parts of low-molecular-weight polypropylene having a molecular weight of 9,000 and 0.1 part of a phenol type stabilizer (antioxidant). Then, about 30 g of the resin composition was melt-extruded from an extruder at an extruded resin temperature of 180° to 183° C., the extrudate was placed on a lower female mold half of a molding machine, and the above-mentioned foam composite was set between an upper male mold half and the lower female mold half while maintaining the mold temperature at 60° C. Compression molding was carried out under a pressure of 30 kg/cm² by a hydraulic press to obtain a molded laminated article.

EXAMPLE 23

A molded laminated article was prepared by carrying out compression molding under the same conditions as described in Example 22 except that a polypropylene resin having a melt index of 10 g/10 min at 190° C. was used as the polypropylene resin.

EXAMPLE 24

A molded laminated article was prepared by carrying out compression molding under the same conditions as described in Example 22 except that a polypropylene resin having a melt index of 20 g/10 min at 190° C. was used as the polypropylene resin.

EXAMPLE 25

A molded laminated article was prepared by carrying out compression molding under the same conditions as described in Example 22 except that a polypropylene resin having a melt index of 35 g/10 min at 190° C. was used as the polypropylene resin.

EXAMPLE 26

A molded laminated article was prepared by carrying out compression molding under the same conditions as described in Example 22 except that a polypropylene resin having a melt index of 45 g/10 min at 190° C. was used as the polypropylene resin.

With respect to each of the molded laminated articles obtained in Examples 22 through 25, the surface state of the molded article and the state of destruction of cells of the foam of the molded article were examined, and the results are shown in Table 5.

TABLE 5

| Example No. | Melt Index of Polypropylene Resin at 190° C. (g/10 min) | | | | | Average Expansion Ratio | Gel Proportion of Foam (%) |
| --- | --- | --- | --- | --- | --- | --- | --- |
| | 4 | 10 | 20 | 35 | 45 | | |
| 22 | B | — | — | — | — | 22.2 | 48.9 |
| 23 | — | A | — | — | — | 22.2 | 48.9 |
| 24 | — | — | A | — | — | 22.2 | 48.9 |
| 25 | — | — | — | A | — | 22.2 | 48.9 |
| 26 | — | — | — | — | A | 22.2 | 48.9 |

EXAMPLES 27 AND 28

A foaming composition prepared by mixing 100 parts of a mixture comprising 80% of a propylene copolymer having 4% of ethylene copolymerized therewith and 20% of linear polyethylene having a melt index (MI) of 7.0 and a density of 0.930 g/cm$^3$ with 6 parts (Example 27) or 15 parts (Example 28) of azodicarbonamide as the foaming agent, 3 parts of divinylbenzene as the crosslinking promoter and 0.3 part of a phenol/phosphorus type stabilizer was melt-extruded into a sheet having a thickness of 1.55 mm by an extruder according to the T-die method. The sheet was irradiated with ionizing radiation so that the ratio of the irradiation energy on one surface to the irradiation energy on the other surface was 1.3 and the average gel proportion was 50%. Then, rapid foaming was effected in a salt bath maintained at 230° C. to obtain a foam. The average cell diameter of the surface layer portion on one side of the obtained foam was 60 μm, and the average cell diameter of the surface layer portion on the other side was 180 μm. The expansion ratio of the surface layer portion on one side was 13.5 and the expansion ratio of the surface layer portion on the other side was 14.5. The endothermic peak temperature TmF of the foam was 135° C., and the thickness was 3.0 mm. A plasticized polyvinyl chloride resin sheet as the skin material was bonded to the large expansion ratio side of the foam by using a polyester type adhesive to obtain a composite. A molten polypropylene resin as the skeleton material was placed at a resin temperature of 175° C. on the opposite surface (the fine average cell size side) of the composite and molding was carried out under a pressure of 60 kg/cm$^2$.

The characteristics of the obtained molded articles are shown in Table 6.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

TABLE 6

| Example No. | Amount of Foaming Agent (parts) | Average Gel Proportion (%) | Average Expansion Ratio | Average Cell Diameter of Surface Layer Portion (μm) | Integral Moldability | |
|---|---|---|---|---|---|---|
| | | | | | Surface State | Thickness Reduction Ratio of Foam* (%) |
| 27 | 6 | 49.6 | 14.7 | 165 | A | 39 |
| 28 | 15 | 51.3 | 30.3 | 180 | B | 42 |

Note
*Thickness reduction ratio (%) = [(thickness of foam before integral molding − thickness of foam after integral molding)/thickness of foam before integral molding] × 100

We claim:
1. A molded, laminated composite comprising:
   (a) a crosslinked polyolefin resin foam having an average gel proportion of 10 to 75% and an average expansion ratio of 5 to 40, in which the average expansion ratio in a portion having a thickness of 0.5 mm on one side of the foam surface is larger than the average expansion ratio in a portion having a thickness of 0.5 mm on the other side of the foam surface thereof and the difference between said average expansion ratios is from 2 to 20,
   (b) a skin material bonded to the surface having the larger average expansion ratio, and
   (c) a thermoplastic resin skeleton material integrally molded to the other surface thereof.

2. The molded, laminated composite of claim 1, wherein the average gel proportion of the crosslinked polyolefin resin foam is at least 35%.

3. The molded, laminated composite of claim 1, wherein at least one surface of the crosslinked polyolefin resin foam is a cell-exposed surface.

4. The molded, laminated composite of claim 3, wherein a portion having a thickness of 0.5 mm from the cell-exposed surface has a gel proportion of at least 35%.

5. The molded, laminated composite of claim 1, wherein a surface layer portion having a thickness of 1 mm from the surface of the crosslinked polyolefin resin foam on the side, with which the skeleton material is in contact, has an average cell diameter not larger than 200 μm.

6. The molded, laminated composite of claim 1, wherein the thermoplastic resin as the skeleton material is a polyolefin resin having a melt index of at least 1.0 g/10 min as measured at 190° C.

7. The molded, laminated composite of claim 6, wherein the thermoplastic resin as the skeleton material has an endothermic peak temperature of from (TmF−60° C.) to (TmF+60° C.), in which TmF stands for an endothermic peak temperature of the crosslinked polyolefin resin foam as determined by a differential scanning calorimeter (DSC).

8. The molded, laminated composite of claim 1, wherein the thermoplastic resin as the skeleton material is a mixture comprising 100 parts by weight of a polyolefin resin having a melt index of 1 to 60 g/10 min as measured at 190° C. and 2 to 40 parts by weight of a low-molecular-weight polyolefin resin having an average molecular weight of 2,000 to 20,000.

9. The molded, laminated composite of claim 1, wherein the crosslinked polyolefin resin foam comprises a copolymer of propylene and ethylene, the skin material is polyvinyl chloride and the skeleton material is polypropylene.

10. The molded, laminated composite of claim 1, wherein the crosslinked polyolefin is a mixture of propylene-ethylene copolymer and ethylene-butene copolymer.

11. The molded, laminated composite of claim 1, wherein the crosslinked polyolefin is a mixture of a propylene copolymer having ethylene random/block copolymerized therewith and an ethylene copolymer having hexene copolymerized therewith.

* * * * *

UNITED STATES PATENT AND TRADEMARK OFFICE
CERTIFICATE OF CORRECTION

PATENT NO. : 5,075,162

DATED : December 24, 1991

INVENTOR(S) : Shuji OKUBO et al

It is certified that error appears in the above-identified patent and that said Letters Patent is hereby corrected as shown below:

On the title page:

Item [75] Inventors: change "Fusayoshi Akimaaru" to --Fusayoshi Akimaru--.

Signed and Sealed this

First Day of June, 1993

Attest:

MICHAEL K. KIRK

*Attesting Officer*  *Acting Commissioner of Patents and Trademarks*